US005973718A

United States Patent [19]

Charnitski et al.

[11] Patent Number: 5,973,718

[45] Date of Patent: Oct. 26, 1999

[54] METHOD AND APPARATUS TO CORRECT FOR ACTIVE WRITE LENGTH AND BOW CHANGES IN LED PRINT BARS

[75] Inventors: George A. Charnitski, Fairport; Robert H. Melino, Webster; Stephen C. Corona, Rochester; James D. Rees, Pittsford, all of N.Y.

[73] Assignee: Xerox Corporation, Stamford, Conn.

[21] Appl. No.: 07/981,919

[22] Filed: Nov. 23, 1992

Related U.S. Application Data

[63] Continuation of application No. 07/779,655, Oct. 21, 1991, abandoned.

[51] Int. Cl.[6] .................................. B41J 2/46; G02B 3/00; G02B 6/06

[52] U.S. Cl. ............................ 347/242; 359/652; 385/116

[58] Field of Search .................................. 346/107 R, 1.1; 355/1; 358/472, 484; 385/116, 120, 121; 359/652, 653, 654

[56] References Cited

U.S. PATENT DOCUMENTS

| | | | |
|---|---|---|---|
| 4,427,284 | 1/1984 | Dannatt | 355/1 |
| 4,589,736 | 5/1986 | Herrigan et al. | 359/652 |
| 4,904,049 | 2/1990 | Hegg | 385/116 |

FOREIGN PATENT DOCUMENTS

| | | | |
|---|---|---|---|
| 60-217323 | 10/1985 | Japan | G02B 7/11 |
| 63-234522 | 9/1988 | Japan | H01L 27/30 |

OTHER PUBLICATIONS

Rees, James D. and Smith, Abbott "A Gradient Index Lens Array for Imaging a Curved Object Onto a Planar Image Plane". In: *Xerox Disclosure Journal*, Jul./Aug. 1984, vol. 9, No. 4, pp. 257–258.

*Primary Examiner*—David F. Yockey

[57] ABSTRACT

An image bar printing system, which, in a preferred embodiment, utilizes a plurality of LED arrays to provide a plurality of color images. The print bars are used in conjunction with a plurality of gradient index lens arrays which optically couple and focus the LED outputs onto a photosensitive surface. In order to maintain image-to-image registration, out of spec deviations in active write length of the image bar and scan line bow are identified and compensated for by selective deformation of one or more lens arrays in a specified manner. The lens deformation serves to reorient the position of certain of the lens elements, redirecting the transmitted LED outputs so as to shorten or lengthen the active write length, or to eliminate bow in the scan line.

2 Claims, 2 Drawing Sheets

METHOD AND APPARATUS TO CORRECT FOR ACTIVE WRITE LENGTH AND BOW CHANGES IN LED PRINT BARS

This a continuation of application Ser. No. 07/779,655, filed Oct. 21, 1991 now abandoned.

BACKGROUND AND MATERIAL DISCLOSURE STATEMENT

The present invention is related to printing systems incorporating light emitting print bars as the imager, and more particularly, to a print system using LED print bars which are corrected for length changes and bowing of the image at a photosensitive image plane.

Image print bars used in xerographic recording systems are well known in the art. The print bar generally consists of a linear array of a plurality of discrete light emitting sources. Light emitting diode (LED) arrays are preferred for many recording applications. In order to achieve high resolution, a large number of light emitting diodes, or pixels, are arranged in a linear array and means are included for providing a relative movement between the linear array and the photoreceptor so as to produce a scanning movement of the linear array over the surface of the photoreceptor. Thus, the photoreceptor may be exposed to provide a desired image one line at a time as the LED array is advanced relative to the photoreceptor either continuously or in stepping motion. Each LED pixel in the linear array is used to expose a corresponding area in the photoreceptor to a value determined by image defining video data information.

In a color xerographic system, a plurality of print bars may be positioned adjacent the photoreceptor surface and selectively energized to create successive image exposures, one for each of the three basic colors. A fourth print bar may be added if black images are to be created as well.

FIG. 1 shows a prior art single pass color configuration having three exposure stations, 10, 12, 14, each station including an LED array 10A, 12A, 14A. Each array is optically coupled to focus the array outputs on to the surface of a photoreceptor belt 16 forming three spaced latent images $l_1$, $l_2$, $l_3$. The optical coupling is accomplished by a plurality of gradient index lens arrays 10B, 12B, 14B, the lens arrays sold under the name SELFOC™ a trademark of Nippon Sheet Glass Company, LTD. Upstream of each exposure station, a charge device 18, 20, 22 places a predetermined charge an the surface of belt 16. Downstream from each exposure station, a development system 26, 28, 30 develops a latent image of the last exposure without disturbing previously developed images.

With such a system as that disclosed in FIG. 1, each colored image must be precisely aligned such that all corresponding pixels in the image areas are registered. The LED array alignment requirements are that pixels of each array be aligned in the scan or Y-direction of FIG. 1 so that each active write length is equal. The array must also be aligned in the skew or X-direction. This alignment must be maintained through continuous revolutions (passes) of the photoreceptor.

There are several problems in the prior art when using multiple LED arrays writing on a photoreceptor in sequential imaging zones to produce an output print with multiple color. To maintain exact color registration of each image, typically to a tolerance of ±0.1$\mu$, the overall length of the write area, the pixel to pixel placement, and the straightness of the image line must all be within a required exacting tolerance. One of the most difficult manufacturing tolerances to achieve is the overall or active write length of the array. For example, for a 14.33" LED array with 300 spi resolution, 4300 pixels are aligned in the active write area and a ±15$\mu$ tolerance in write length is typical. A second problem is in maintaining the image line straightness. Imaged line deviation, known as bow, is a displacement perpendicular to the image line formed traversely to the photoreceptor surface, the bow occurring in the central portion of the imaged line.

According to the present invention, corrections to both of these print bar problems are accomplished by changing the physical properties of the gradient index lens arrays, which are optically coupled to the LED array outputs. It has been found that deforming the lens by applying a force at the lens array center or, alternately, at one or both ends of the array will either shorten or lengthen the active write length depending upon the direction that the force is applied and the magnitude of the force. It has further been found that applying a twisting force, or torque, to the center of the lens will move the central part of the image in a direction perpendicular to the image line, and thus, dependent upon the degree of torque, can reduce or eliminate a previously identified bow in the scan line.

More particularly, the present invention is directed towards a printer system including a line exposure apparatus for creating line images on a photoreceptor moving in a process direction comprising:

- at least one image print bar including a linear array of a plurality of discrete light emitting sources,
- a linear lens array for focusing light from said emitting sources onto said photoreceptor, and
- means for deforming said lens array so as to alter the path of selected ones of said emitter sources being transmitted through said lens array, thereby altering the line image characteristics.

The following references have been identified in a prior art search.

U.S. Pat. No. 4,427,284 to Dannatt discloses an adjustment means for a fiber optic illuminator which includes a flexible lens assembly situated intermediate an array of fiber ends and a platen. A deflectable frame supports the flexible lens frame so that the flexible lens assembly can be transversely deflected to modify the linearity of the lens assembly without disturbing the focal adjustment thereof.

Japanese Patent No. 63-234522 to Hayashi discloses a reduction projection type exposure device including a spherically curved condenser lens 1 made of an elastically deformable transparent material. The lens has radially directed curvature changing arms 5 extending from its peripheral edges. By applying compressive or tensile loads to the arms, the curvature radius of the condenser lens can be controlled to equalize a pattern diameter over an exposure region.

Japanese Patent No. 60-217323 to Usui discloses an automatic focus optical device comprising a transparent elastic body 3 inside a cylindrical vessel 1 having a circular opening 2 in the top end thereof and a movable transparent plate 4 covering the bottom end. In accordance with the magnitude of a pressure applied to the movable plate, part of the elastic body projects from the opening in the top of the vessel in the shape of a convex lens or sinks in the shape of a concave lens.

DESCRIPTION OF THE DRAWINGS

FIGS. 3A and 3B single, centrally located LED emitter corrected for bow by twisting the center of the gradient index lens array.

DESCRIPTION OF THE INVENTION

Referring again to FIG. 1, LED print bars 10, 12, 14 include conventional LED linear arrays with a resolution of 300 spots per inch (300 spi), and a pixel size of 50×50 microns on 84.67 micron centers. In an application, where an 8.5 inch wide informational line (active write length) is to be exposed, an LED array of approximately 2550 pixels, arrayed in a single row, would be required.

Figure 1:
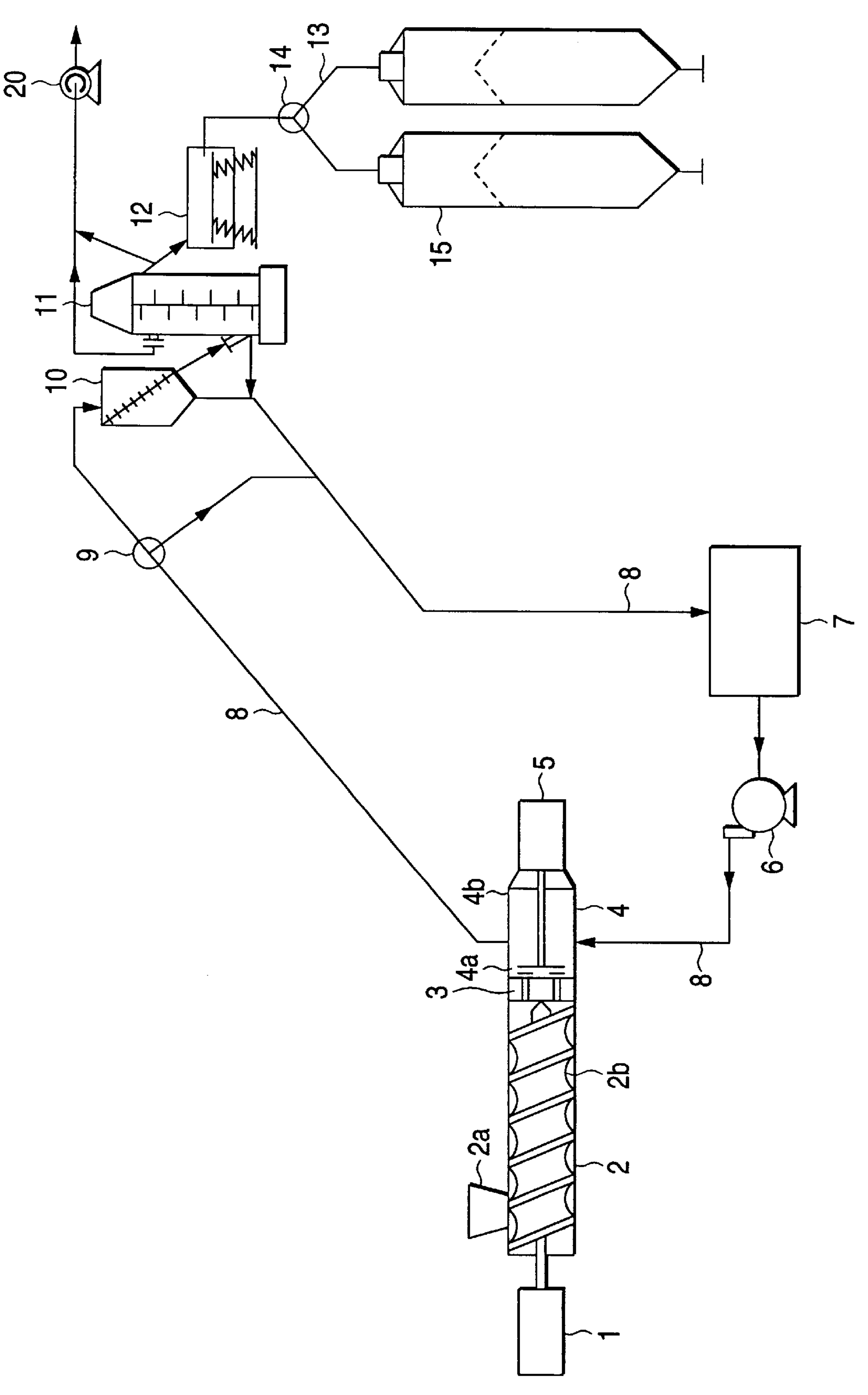
FIG. 1 shows a top perspective view of a prior art multi-print bar imaging system.
Figure 2:
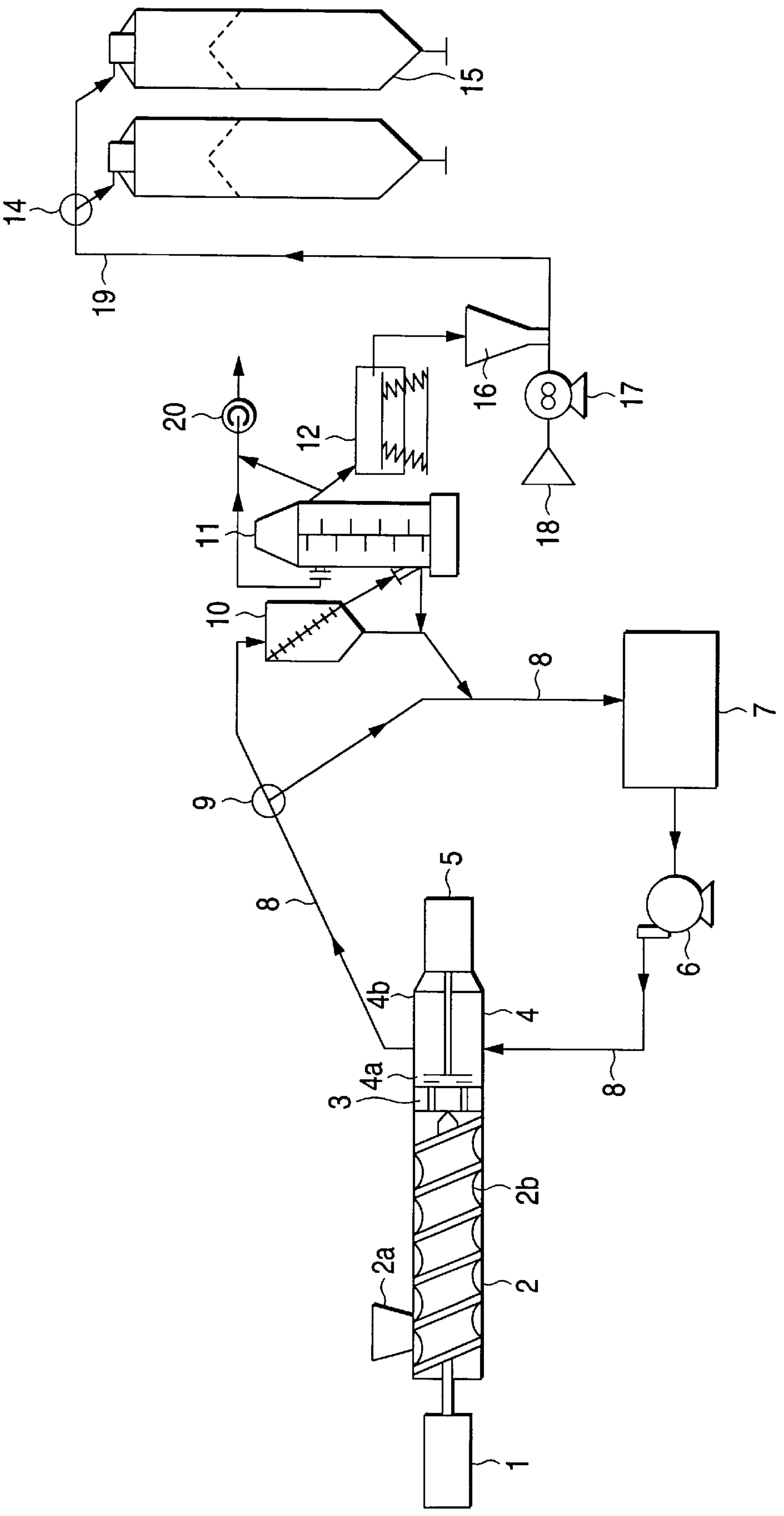
FIG. 2 PRIOR ART
FIG. 2 shows a side view of a single imaging station showing a gradient index lens array being subjected to forces at its center to lengthen or shorten the active write length of an LED array.

It is assumed, for purposes of describing the invention, that the system shown in FIG. 1 has been tested and it has been determined that the active write length for image $l_1$ is within tolerance; that the active write length for image $l_2$ is shorter than a given tolerance and that the active write length for image $l_3$ is longer than the given tolerance. According to a first aspect of the present invention, it has been found that application of force at the center of lens array 12B and 14B, in a specific direction, and of a predetermined magnitude, will deform the lens array by a specified deflection amount so that the active write length is either shortened or lengthened. FIG. 2 shows the situation for print bar 12. The emitters of LED array 12A form the outer limit of active write lens at points P, P'. However, the desired end points are at point $P_1$ $P_1$' a distance shown as X/2. It is assumed that X/2 is some value which exceeds the ±15μ tolerance. Lens array 12B has been deformed at the center by applying a force F at approximately the center of the lens. Application of this force has the effect of tilting individual lens fibers at the array end causing shifting of the end pixels of array 12.

The amount of shift is dependent on the amount of tilt, in radians, of the end fibers, and is given by:

$$TH = \arcsin\left(\frac{X}{2(TC)}\right) \quad (1)$$

There is no tilting of the fibers at the center of the lens, thus, there is no shifting of the aerial image. The increased tilting toward the end of the lens array is dependent on the distance from the center to the end of the lens, and thus the aerial image changes uniformly. The amount of tilt is controlled by the amount of force F on the center of the lens. The amount of deflection, D, required for an X change in overall length is given by:

$$D = \left(TC\left(\frac{W}{X}\right)(1 - \cos(TH))\right) \quad (2)$$

where TC is the total conjugate for the particular system.

The amount of force necessary to deflect the lens is dependent on the type of SELFOC lens array used, i.e., an SLA-09, SLA-12, or SLA-20 is used. An SLA-20 with its small cross sectional area will require very little force, while an SLA-06 with its longer fiber length will require more. For example, the amount of force for the SLA-06 is on the order of 1 pound per 0.001" deflection at the center of the lens.

The amount of deflection (D) necessary at the center of the lens, again, is dependent on the type of lens. For an SLA-20, the Total Conjugate (TC) is short (17.1 mm), therefore, more tilting of the end fibers is required, thus more deflection at the center. For an SLA-06 with a longer total conjugate (64 mm), less tilting is required. There is another advantage to the longer conjugate lens, i.e., the depth of focus is typically larger thus allowing more deflection at the center of the lens before the center pixels go out of focus. This loss of focus at the center of the lens is a detriment for the SLA-20 lens, however, the SLA-12 lens will work quite satisfactorily with the increased depth of focus and the longer TC.

It will be appreciated that, while the above description defined the forced deflection needed to shorten the active write length for array 12, the same principles apply to increasing the write length, thus causing the same magnitude of write length error for image bar 14. The write length can be increased by application of the same force F applied in an upward direction to the center of lens array 15, creating an upward deflection D. One method of applying force F is to use a stepper motor and lead screw, which together form a means 17 for applying the force P.

The above assumption predicted that the active write length was shortened or lengthened by an equal amount at both ends. For some systems, and according to a second aspect of the invention, one end may be positioned correctly with the other end causing the length change. For this case, the force F may be applied at the end of the lens array requiring the correction, thus changing only the imaging position of the last pixel at the one end. FIG. 2 shows the forces F, F' in dotted form being applied to the end portions of the array. One of the forces would be applied, while the force F at the center portion would be removed.

According to a still further aspect of the invention, some systems may not sustain the slight less of focus at the array center created by application of the force F. In this case, the two forces, F, F', shown in dotted form, both may be applied to both ends of the lens, thereby maintaining good focus at the center. Again, the center applied force F would be absent. With any of the above described methods, the overall active write length can be modified by amounts up to 4 pixels or 340μ for a 300 spi print bar.

Considering next the question of bow development, it is again assumed that pixel to pixel placement at one or more LED bars has resulted in a deviation of the scan line in the X direction. FIG. 3A shows a central emitter of array 12A being focused by a centrally located optical fiber of lens array 12B. Pixel 10A is placed so as to create an image spot P perpendicular to the properly exposed P' on the scan line. It has been found that the image point can be adjusted to correct for the bow by creating a slight distortion of lens 12B by applying a twisting torque to the lens center. This torque has the effect of moving the image at the lens center, but not at the ends. As an example, a torque of about 0.1° will move the point P to point P' as shown in FIG. 3B, assuming lens array 12A is an SLA-20 lens.

Summarizing the above operations, various corrections can be made to compensate for out-of-spec print bar characteristics, such as active write length and beam straightness, by deforming the gradient index lens array optical coupler associated with a particular LED array. The deformation can be applied in the center of the lens array, or at one or both ends of the lens array, to shift the spot imaged by the end most pixels, along the length of the image line. The deformation can also take the form of twisting the center of the lens array to correct for the centrally located bow distortion.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. In a printer system, a line exposure apparatus for creating line images on a photoreceptor moving in a process direction comprising:

at least one image print bar including a linear array of light emitting diodes (LEDs), each of said LEDs having an individual light output when pulsed, and a linear gradient index lens array having a center portion and a first and second end portion, for focusing light outputs from said LEDs to form said line images with an active write length onto said photoreceptor, a distance between the LEDs and the photoreceptor being defined as a total conjugate TC, and means for deforming each said lens array by applying at least a force F in a direction perpendicular to a surface of the lens array to change said active write length by a distance X and wherein said lens array force F is applied to the center portion of each lens array and wherein said force F causes the linear array to be deflected a distance D in the direction of the applied force F, said distance D required for an X change in overall length W being given by an expression $$D = \left(TC\frac{W}{X}\right)(1 - \cos(TH))$$

where TH=arc sin.

2. In a printer system a line exposure apparatus for creating line images on a photoreceptor moving in a process direction comprising:

at least one image print bar including a linear array of light emitting diodes (LEDs), each of said LEDs having an individual light output when pulsed, and a linear lens array having a center portion for focusing light outputs from said LEDs to form said line image with an active write length on said photoreceptor, and means for applying a twisting torque to the center of each linear lens array to move an image formed at the lens center portion.

* * * * *